US010492366B1

(12) United States Patent
Knudsen

(10) Patent No.: US 10,492,366 B1
(45) Date of Patent: Dec. 3, 2019

(54) LAWN MOWER CADDY

(71) Applicant: Kellie Knudsen, Riverdale, UT (US)

(72) Inventor: Kellie Knudsen, Riverdale, UT (US)

( * ) Notice: Subject to any disclaimer, the term of this patent is extended or adjusted under 35 U.S.C. 154(b) by 0 days.

(21) Appl. No.: 16/030,996

(22) Filed: Jul. 10, 2018

(51) Int. Cl.
*A01D 75/00* (2006.01)
*A01D 101/00* (2006.01)

(52) U.S. Cl.
CPC ........ *A01D 75/008* (2013.01); *A01D 2101/00* (2013.01)

(58) Field of Classification Search
CPC .......................... A01D 75/005; A01D 2101/00
USPC ......................................................... 224/401
See application file for complete search history.

(56) References Cited

U.S. PATENT DOCUMENTS

| | | | |
|---|---|---|---|
| 4,339,061 A * | 7/1982 | Dunn .................... A61G 5/10 116/67 R |
| 4,830,238 A * | 5/1989 | Widinski ................. B62B 9/26 224/409 |
| 5,012,963 A * | 5/1991 | Rosenbaum ............. A61H 3/00 135/67 |
| 5,040,711 A | 8/1991 | Niederhauser | |
| 5,326,175 A * | 7/1994 | Carter ................. A01D 75/008 224/401 |
| 5,417,353 A | 5/1995 | Stall | |
| 5,493,852 A * | 2/1996 | Stewart .................. A01C 15/06 222/485 |
| 5,743,650 A * | 4/1998 | Shannon .................. A61G 5/10 224/407 |
| D442,409 S | 5/2001 | Curran | |
| 7,748,584 B2 | 7/2010 | Easom | |
| 8,701,952 B1 * | 4/2014 | Tripp ...................... B60R 11/06 224/543 |
| D710,910 S * | 8/2014 | Call .............................. D15/17 |
| 9,907,231 B2 * | 3/2018 | Ponce .................. A01D 75/008 |
| 2009/0020574 A1 | 1/2009 | Sloan | |
| 2009/0266856 A1 | 10/2009 | Ponce | |

FOREIGN PATENT DOCUMENTS

EP         1367016 A      10/2007

* cited by examiner

*Primary Examiner* — Peter N Helvey

(57) ABSTRACT

The lawnmower caddy is a storage apparatus. The lawnmower caddy is configured for use with a lawnmower. The lawnmower caddy is configured to store items associated with mowing a lawn. Such items include, but are not limited to, waste bags, apparel such as hats and glove, agricultural chemical formulations, agricultural tools, and beverage containers. The lawnmower caddy attaches to the lawnmower handle. The lawnmower caddy comprises a storage bag, a first holster, a plurality of fasteners, and a plurality of pockets. The plurality of fasteners and the first holster attach to the exterior of the storage bag. The plurality of fasteners attach the storage bag to the lawnmower handle. The plurality of fasteners further attaches a container of agricultural chemicals to the storage bag. The plurality of pockets contain agricultural tools, agricultural waste, and one or more domestic articles.

13 Claims, 4 Drawing Sheets

LAWN MOWER CADDY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture including harvesting and mowing, more specifically, a tool-carrying accessory configured for use with a mower.

SUMMARY OF INVENTION

The lawnmower caddy is a storage apparatus. The lawnmower caddy is configured for use with a lawnmower. The lawnmower further comprises a lawnmower handle. The lawnmower handle is further defined with a first arm, a second arm, and a crossbeam. The lawnmower caddy is configured to store items associated with mowing a lawn. Such items include, but are not limited to, waste bags, apparel such as hats and glove, agricultural chemical formulations, agricultural tools, and beverage containers. The lawnmower caddy attaches to the lawnmower handle. The lawnmower caddy comprises a storage bag, a first holster, a plurality of fasteners, and a plurality of pockets. The plurality of fasteners and the first holster attach to the exterior of the storage bag. The plurality of fasteners attach the storage bag to the lawnmower handle. The plurality of fasteners further attaches a container of agricultural chemicals to the storage bag. The plurality of pockets contain agricultural tools, agricultural waste, and one or more domestic articles.

These together with additional objects, features and advantages of the lawnmower caddy will be readily apparent to those of ordinary skill in the art upon reading the following detailed description of the presently preferred, but nonetheless illustrative, embodiments when taken in conjunction with the accompanying drawings.

In this respect, before explaining the current embodiments of the lawnmower caddy in detail, it is to be understood that the lawnmower caddy is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the lawnmower caddy.

It is therefore important that the claims be regarded as including such equivalent construction insofar as they do not depart from the spirit and scope of the lawnmower caddy. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
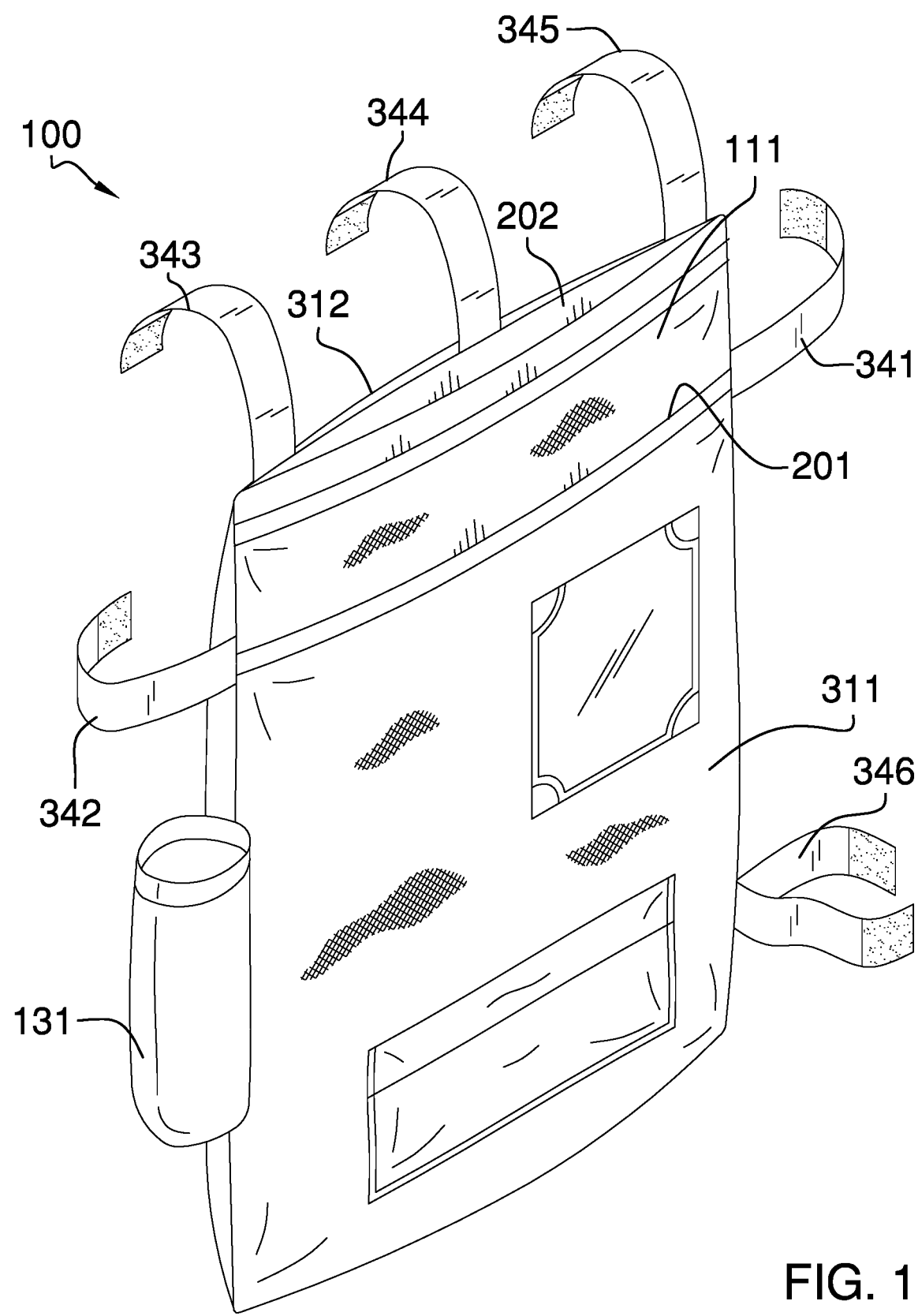
FIG. 1 is a perspective view of an embodiment of the disclosure.
Figure 2:
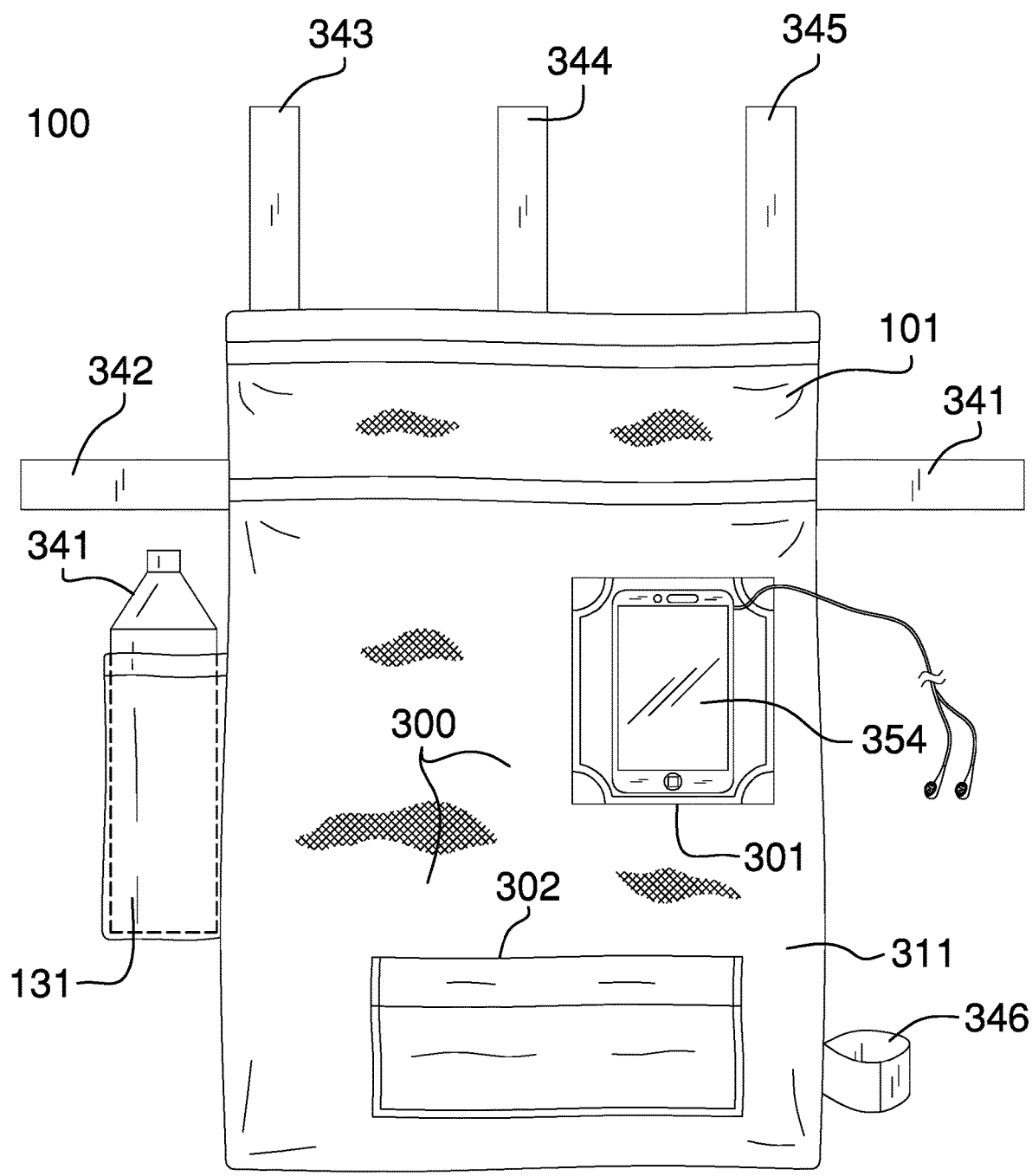
FIG. 2 is a front view of an embodiment of the disclosure.
Figure 3:
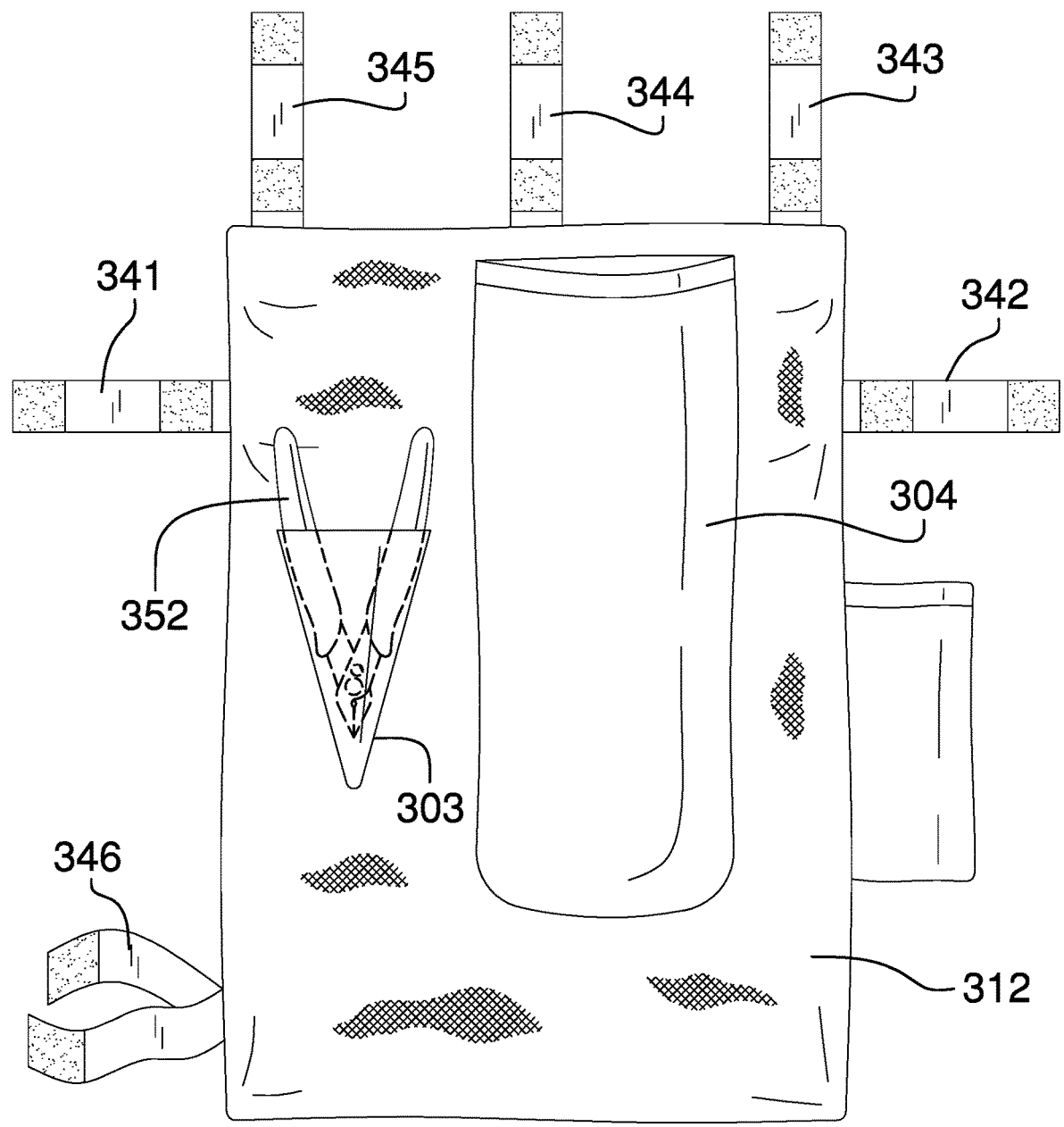
FIG. 3 is a rear view of an embodiment of the disclosure.
Figure 4:
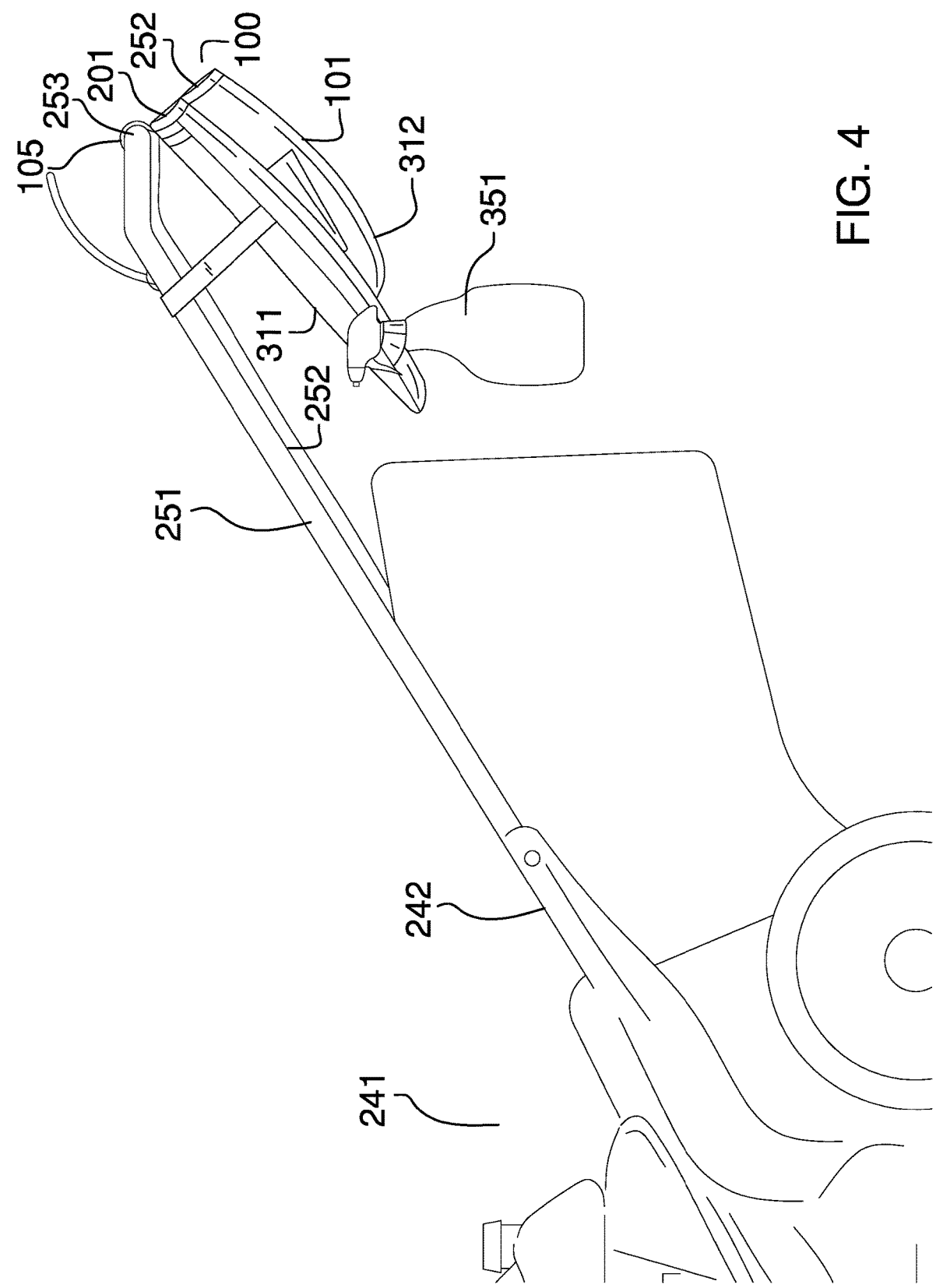
FIG. 4 is an in-use view of an embodiment of the disclosure.

Detailed reference will now be made to one or more potential embodiments of the disclosure, which are illustrated in FIGS. 1 through 4.

The lawnmower caddy 100 (hereinafter invention) is a storage apparatus. The invention 100 is configured for use with a lawnmower 241. The lawnmower 241 further comprises a lawnmower 241 handle 242. The lawnmower 241 handle 242 is further defined with a first arm 251, a second arm 252, and a crossbeam 253. The invention 100 is configured to store items associated with mowing a lawn. Such items include, but are not limited to, waste bags, apparel such as hats and glove, agricultural chemical formulations 351, agricultural tools 352, and beverage containers 353. The invention 100 attaches to the lawnmower 241 handle 242. The invention 100 comprises a storage bag 101, a first holster 131, a plurality of fasteners 105, and a plurality of pockets 300. The plurality of fasteners 105 and the first holster 131 attach to the exterior of the storage bag 101. The plurality of fasteners 105 attach the storage bag 101 to the lawnmower 241 handle 242. The plurality of fasteners 105 further attaches a container of agricultural chemicals 351 to the storage bag 101. The plurality of pockets 300 contain agricultural tools 352, agricultural waste, and one or more domestic articles 354.

The lawnmower 241 is a machine used for cutting grass in a field. The lawnmower 241 handle 242 is an extension structure that attaches to a lawnmower 241. The lawnmower 241 handle 242 is used to push and control the lawnmower 241. The invention 100 attaches to the lawnmower 241 handle 242. The lawnmower 241 handle is a hyoid shaped structure that further comprises a first arm 251, a second arm 252 and a crossbeam 253. The first arm 251 is a shaft that attaches directly to the lawnmower 241 in the manner of a cantilever. The second arm 252 is a shaft that attaches directly to the lawnmower 241. The crossbeam 253 is a shaft that attaches the free end of the first arm 251 to the free end of the second arm 252.

The storage bag 101 is the primary storage container of the invention 100. The storage bag 101 is a bag. The storage bag 101 is further defined with first chamber 201, a second chamber 202, a front side 311, and a rear side 312.

The first chamber 201 and the second chamber 202 are provided for organizational purposes. The first chamber 201 is a first of two segregated spaces formed within the storage bag 101. The second chamber 202 is a second of two segregated spaces formed within the storage bag 101.

The storage bag 101 further comprises a divider 111. The divider 111 is a sheeting installed within the hollow interior of the storage bag 101. The divider 111 divides the interior space of the storage bag 101 into the first chamber 201 and the second chamber 202.

The first holster 131 is a structure that is configured to store a liquid container. The first holster 131 is a textile-based containment structure. The first holster 131 forms a first negative space. The first holster 131 has the shape of a capped cylinder. The first negative space of the first holster 131 is sized to contain a bottle. The first holster attaches to the exterior of the storage bag 101. The first holster 131 is sized to store a beverage container 353.

Each of the plurality of fasteners 105 is a commercially available fastening device. The plurality of fasteners 105 attach the storage bag 101 to the lawnmower 241 handle 242. The plurality of fasteners 105 comprises a first hook and loop fastener 341, a second hook and loop fastener 342, a third hook and loop fastener 343, a fourth hook and loop fastener 344, a fifth hook and loop fastener 345, and a sixth hook and loop fastener 346. Wherein the first hook and loop fastener 341 and the second hook and loop fastener 342 are identical. The third hook and loop fastener 343, the fourth hook and loop fastener 344, and the fifth hook and loop fastener 345 are identical.

The first hook and loop fastener 341 is a commercially available fastener. The first hook and loop fastener 341 is a single strap device. The first hook and loop fastener 341 attaches the storage bag 101 to the first arm 251 of the lawnmower 241 handle 242.

The second hook and loop fastener 342 is a commercially available fastener. The second hook and loop fastener 342 is a single strap device. The second hook and loop fastener 342 attaches the storage bag 101 to the second arm 252 of the lawnmower 241 handle 242.

The third hook and loop fastener 343 is a commercially available fastener. The third hook and loop fastener 343 is a single strap device. The third hook and loop fastener 343 attaches the storage bag 101 to the crossbeam 253 of the lawnmower 241 handle 242.

The fourth hook and loop fastener 344 is a commercially available fastener. The fourth hook and loop fastener 344 is a single strap device. The fourth hook and loop fastener 344 attaches the storage bag 101 to the crossbeam 253 of the lawnmower 241 handle 242.

The fifth hook and loop fastener 345 is a commercially available fastener. The fifth hook and loop fastener 345 is a single strap device. The fifth hook and loop fastener 345 attaches the storage bag 101 to the crossbeam 253 of the lawnmower 241 handle 242.

The first hook and loop fastener 341, the second hook and loop fastener 342, the third hook and loop fastener 343, the fourth hook and loop fastener 344, and the fifth hook and loop fastener 345 attach to the rear side 312 of the storage bag 101.

The sixth hook and loop fastener 346 is a commercially available fastener. The sixth hook and loop fastener 346 is a dual strap fastening device. The sixth hook and loop fastener 346 hangs an agricultural chemical container 351 from the storage bag 101.

Each of the plurality of pockets 300 is a pocket formed on the exterior surface of the storage bad 101. The plurality of pockets comprises a first pocket 301, a second pocket 302, a third pocket 303, and a fourth pocket 304.

The first pocket 301 attaches to the front side 311 of the storage bag 101. The first pocket 301 has a rectangular shape. The first pocket 301 is sized to receive and hold a domestic article 354. The second pocket 302 attaches to the front side 311 of the storage bag 101. The second pocket 302 has a rectangular shape. The second pocket 302 is a closable pocket. The second pocket 302 is sized to receive and hold a domestic article 354.

The third pocket 303 attaches to the rear side 312 of the storage bag 101. The third pocket 303 has a triangular shape. The third pocket 303 is sized to receive and hold an agricultural tool 352. The fourth pocket 304 attaches to the rear side 312 of the storage bag 101. The fourth pocket 304 has a rectangular shape. The fourth pocket 304 is sized to receive and hold agricultural waste.

The following definitions were used in this disclosure:

Bag: As used in this disclosure, a bag is a container made of a flexible material. The bag has a single opening which allows the bag to receive the items to be contained.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Capped Tube: As used in this disclosure, a capped cylinder is a hollow cylinder with one closed end and one open end.

Cylinder: As used in this disclosure, a cylinder is a geometric structure defined by two identical flat and parallel ends, also commonly referred to as bases, which are circular in shape and connected with a single curved surface, referred to in this disclosure as the face. The cross-section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Disposable: As used in this disclosure, disposable is an adjective that refers to an object that is designed and intended for a single use. Within this context, an object is disposable if it is not reusable after its initial use.

Domestic Article: As used in this disclosure, a domestic article is an item or object: 1) that is commonly found within a household; or, 2) that is commonly carried by a person. Examples of domestic articles include, but are not limited to, keys and key fobs, personal data devices, glasses, remote controls, or personal storage items such as purses, briefcases, wallets, or cases.

Extension Structure: As used in this disclosure, an extension structure is an inert physical structure that is used to extend the span of the distance between any two objects.

Exterior: As used in this disclosure, the exterior is used as a relational term that implies that an object is not contained within the boundary of a structure or a space.

Fastener: As used in this disclosure, a fastener is a device that is used to join or affix two objects. Fasteners generally comprise a first element which is attached to the first object and a second element which is attached to the second object such that the first element and the second element join to affix the first object and the second object. Common fasteners include, but are not limited to, hooks, zippers, snaps, buttons, buckles, quick release buckles, or hook and loop fasteners.

Hang: As used in this disclosure, to hang an object is to suspend an object above a surface from above such that the inferior end of the object does not form a significant portion of the load path of the object.

Hinge: As used in this disclosure, a hinge is a device that permits the turning, rotating, or pivoting of a first object relative to a second object.

Hook: As used in this disclosure, a hook is an object that is curved or bent at an angle such that items can be hung on or caught by the object.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface and the remaining object will have the loop surface.

Hyoid: As used in this disclosure, a hyoid refers to a three-sided structure comprising a crossbeam, a first arm, and a second arm. In a hyoid, the first arm and the second arm project away from the crossbeam: 1) in the same direction; 2) at a roughly perpendicular angle to the crossbeam, and, 3) the span of the length of the first arm roughly equals the span of the length of the second arm. Hyoids generally have a U shaped appearance.

Inferior: As used in this disclosure, the term inferior refers to a directional reference that is parallel to and in the same direction as the force of gravity.

Interior: As used in this disclosure, the interior is used as a relational term that implies that an object is contained within the boundary of a structure or a space.

Latch: As used in this disclosure, a latch is a fastening or locking mechanism. The use of the term latch does not necessarily but often implies the insertion of an object into a notch or cavity.

Lid: As used in this disclosure, a lid is a removable cover that is placed over an opening of a hollow structure to enclose the hollow structure.

Negative Space: As used in this disclosure, negative space is a method of defining an object through the use of open or empty space as the definition of the object itself, or, through the use of open or empty space to describe the boundaries of an object.

Pivot: As used in this disclosure, a pivot is a rod or shaft around which an object rotates or swings.

Pocket: As used in this disclosure, a pocket is a small pouch or storage space that is formed into an object. Pockets are often formed by joining a second textile or a second sheeting to a first textile or a first sheeting, respectively, by sewing or heat sealing respectively. Methods to form pockets are well-known and documented in the textile and apparel arts.

Sheeting: As used in this disclosure, a sheeting is a material, such as a textile, a plastic, or a metal foil, in the form of a thin flexible layer or layers.

Slot: As used in this disclosure, a slot is a long narrow cut or opening that is formed in or through an object.

Strap: As used in this disclosure a strap is a strip of leather, cloth, or other flexible material, often with a fastener, that is used to fasten, secure, carry, or hold onto something.

Strip: As used in this disclosure, the term describes a long and narrow object of uniform thickness that appears thin relative to the length of the object. Strips are often rectangular in shape.

Superior: As used in this disclosure, the term superior refers to a directional reference that is parallel to and in the opposite direction of the force of gravity.

Textile: As used in this disclosure, a textile is a material that is woven, knitted, braided or felted. Synonyms in common usage for this definition include fabric and cloth.

Waste Bag: As used in this disclosure, a waste bag is a disposable bag formed from a sheeting that is used to contain yard waste and other refuse for in a manner suitable for disposal.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A tool carrying accessory comprising
a storage bag, a first holster, a plurality of fasteners, and a plurality of pockets;
wherein the plurality of fasteners and the first holster attach to the exterior of the storage bag;
wherein the tool carrying accessory is configured for use with a lawnmower;

wherein the lawnmower further comprises a lawnmower handle;
wherein the lawnmower handle is further defined with a first arm, a second arm, and a crossbeam;
wherein the tool carrying accessory is configured for use with a container of an agricultural chemical;
wherein the tool carrying accessory is configured for use with an agricultural tool;
wherein the tool carrying accessory is configured for use with a beverage container;
wherein the tool carrying accessory is configured for use with one or more domestic articles;
wherein the lawnmower handle is a hyoid shaped structure that further comprises a first arm, a second arm, and a crossbeam;
wherein the first arm is a shaft that attaches directly to the lawnmower in the manner of a cantilever;
wherein the second arm is a shaft that attaches directly to the lawnmower;
wherein the crossbeam is a shaft that attaches the free end of the first arm to the free end of the second arm;
wherein the storage bag is a bag;
wherein the first holster is a structure is configured to store the beverage container;
wherein the plurality of fasteners attach the storage bag to the lawnmower handle;
wherein the plurality of fasteners attach the container of an agricultural chemical to the storage bag;
wherein the storage bag is further defined with a first chamber, a second chamber, a front side, and a rear side;
wherein the first chamber is a first of two segregated spaces formed within the storage bag;
wherein the second chamber is a second of two segregated spaces formed within the storage bag;
wherein the storage bag further comprises a divider;
wherein the divider is a sheeting;
wherein the divider installs within the hollow interior of the storage bag;
wherein the divider divides the interior space of the storage bag into the first chamber and the second chamber;
wherein the first holster is a textile-based containment structure;
wherein the first holster has the shape of a capped cylinder;
wherein the first holster forms a first negative space;
wherein the first negative space of the first holster is sized to contain the beverage container;
wherein the first holster attaches to the exterior of the storage bag.

2. The tool carrying accessory according to claim 1
wherein the plurality of fasteners comprises a first hook and loop fastener, a second hook and loop fastener, a third hook and loop fastener, a fourth hook and loop fastener, a fifth hook and loop fastener, and a sixth hook and loop fastener;
wherein the first hook and loop fastener and the second hook and loop fastener are identical;
wherein the third hook and loop fastener, the fourth hook and loop fastener, and the fifth hook and loop fastener are identical.

3. The tool carrying accessory according to claim 2
wherein the first hook and loop fastener is a single strap device;
wherein the second hook and loop fastener is a single strap device;
wherein the third hook and loop fastener is a single strap device;
wherein the fourth hook and loop fastener is a single strap device;
wherein the fifth hook and loop fastener is a single strap device.

4. The tool carrying accessory according to claim 3
wherein the first hook and loop fastener attaches the storage bag to the first arm of the lawnmower handle;
wherein the second hook and loop fastener attaches the storage bag to the second arm of the lawnmower handle;
wherein the third hook and loop fastener attaches the storage bag to the crossbeam of the lawnmower handle;
wherein the fourth hook and loop fastener attaches the storage bag to the crossbeam of the lawnmower handle;
wherein the fifth hook and loop fastener attaches the storage bag to the crossbeam of the lawnmower handle.

5. The tool carrying accessory according to claim 4 wherein the first hook and loop fastener, the second hook and loop fastener, the third hook and loop fastener, the fourth hook and loop fastener, and the fifth hook and loop fastener attach to the rear side of the storage bag.

6. The tool carrying accessory according to claim 5 wherein the sixth hook and loop fastener is a dual strap fastening device.

7. The tool carrying accessory according to claim 6 wherein the sixth hook and loop fastener hangs the agricultural chemical container from the storage bag.

8. The tool carrying accessory according to claim 7
wherein each of the plurality of pockets is a pocket;
wherein each of the plurality of pockets is formed on the exterior surface of the storage bag.

9. The tool carrying accessory according to claim 8
wherein the plurality of pockets comprises a first pocket, a second pocket, a third pocket, and a fourth pocket;
wherein the first pocket attaches to the front side of the storage bag;
wherein the second pocket attaches to the front side of the storage bag;
wherein the third pocket attaches to the rear side of the storage bag;
wherein the fourth pocket attaches to the rear side of the storage bag.

10. The tool carrying accessory according to claim 9
wherein the first pocket has a rectangular shape;
wherein the first pocket is sized to receive and hold a domestic article.

11. The tool carrying accessory according to claim 10
wherein the second pocket has a rectangular shape;
wherein the second pocket is a closable pocket;
wherein the second pocket is sized to receive and hold a domestic article.

12. The tool carrying accessory according to claim 11
wherein the third pocket has a triangular shape;
wherein the third pocket is sized to receive and hold an agricultural tool.

13. The tool carrying accessory according to claim 12
wherein the fourth pocket has a rectangular shape;
wherein the fourth pocket is sized to receive and hold agricultural waste.

\* \* \* \* \*